United States Patent
Cho

(10) Patent No.: US 11,914,536 B2
(45) Date of Patent: Feb. 27, 2024

(54) DEVICE AND METHOD FOR SHARING RESOURCE VIA BUS

(71) Applicant: SAMSUNG ELECTRONICS CO., LTD., Suwon-si (KR)

(72) Inventor: Dongsik Cho, Hwaseong-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 105 days.

(21) Appl. No.: 17/579,882

(22) Filed: Jan. 20, 2022

(65) Prior Publication Data

US 2022/0309015 A1 Sep. 29, 2022

(30) Foreign Application Priority Data

Mar. 29, 2021 (KR) .................. 10-2021-0040543

(51) Int. Cl.
*G06F 13/362* (2006.01)
*G06F 1/14* (2006.01)

(52) U.S. Cl.
CPC .............. *G06F 13/362* (2013.01); *G06F 1/14* (2013.01)

(58) Field of Classification Search
CPC .................................. G06F 13/362; G06F 1/14
USPC .......................................... 710/110, 113–118
See application file for complete search history.

(56) References Cited

U.S. PATENT DOCUMENTS

| | | | | |
|---|---|---|---|---|
| 4,987,529 A | * | 1/1991 | Craft ...................... | G06F 13/364 710/113 |
| 5,287,486 A | * | 2/1994 | Yamasaki ............... | G06F 13/28 710/22 |
| 5,301,329 A | * | 4/1994 | Frame ..................... | G06F 13/36 713/502 |
| 5,572,686 A | * | 11/1996 | Nunziata ............... | G06F 13/362 710/241 |
| 5,754,887 A | * | 5/1998 | Damron ............... | G06F 11/0724 710/39 |
| 5,764,931 A | | 6/1998 | Schmahl et al. | |
| 5,894,562 A | * | 4/1999 | Moyer .................. | G06F 13/364 710/36 |
| 5,907,688 A | * | 5/1999 | Hauck .................. | G06F 13/364 710/107 |
| 5,956,493 A | * | 9/1999 | Hewitt .................. | G06F 13/364 710/241 |

(Continued)

FOREIGN PATENT DOCUMENTS

| | | |
|---|---|---|
| JP | 2972491 | 11/1999 |
| JP | 4022719 | 12/2007 |
| JP | 2011-065359 | 3/2011 |

*Primary Examiner* — Paul R. Myers
(74) *Attorney, Agent, or Firm* — F. CHAU & ASSOCIATES, LLC

(57) ABSTRACT

The device described herein, which provides an interface between a plurality of master devices and a slave device, includes: a first timer configured to begin timing when a first access request is received from a first master device via a bus, and to be reset when a semaphore is allocated to the first master device; a second timer configured to begin timing when a second access request is received from a second master device via the bus, and to be reset when a semaphore is allocated to the second master device; and a controller configured to provide a first message to the first master device via the bus when a first expiration interval is measured by the first timer.

20 Claims, 12 Drawing Sheets

(56) References Cited

U.S. PATENT DOCUMENTS

| | | | |
|---|---|---|---|
| 6,108,735 A * | 8/2000 | Pawlowski | G06F 13/385 710/118 |
| 6,115,799 A * | 9/2000 | Ogawa | H04N 1/2129 711/170 |
| 6,157,978 A * | 12/2000 | Ng | G06F 13/364 710/243 |
| 6,178,475 B1 * | 1/2001 | O'Brien | G06F 13/3625 710/116 |
| 6,212,589 B1 * | 4/2001 | Hayek | G06F 13/4031 710/119 |
| 7,062,582 B1 * | 6/2006 | Chowdhuri | H04L 47/20 710/241 |
| 8,751,715 B1 * | 6/2014 | Shubel | G06F 13/372 710/110 |
| 9,940,278 B2 | 4/2018 | Cho et al. | |
| 10,339,085 B2 | 7/2019 | Cho | |
| 10,862,704 B2 | 12/2020 | Sai et al. | |
| 2002/0013915 A1 * | 1/2002 | Migita | G06F 3/0659 714/6.13 |
| 2002/0073259 A1 * | 6/2002 | Grisenthwaite | G06F 9/52 710/107 |
| 2002/0116438 A1 * | 8/2002 | Tu | G06F 9/52 718/104 |
| 2003/0135537 A1 * | 7/2003 | Mikael | G06F 9/52 718/103 |
| 2003/0191880 A1 * | 10/2003 | Lin | G06F 13/3625 710/116 |
| 2003/0223453 A1 * | 12/2003 | Stoler | H04L 49/9023 370/444 |
| 2007/0112986 A1 * | 5/2007 | Chang | G06F 13/364 710/116 |
| 2008/0089361 A1 * | 4/2008 | Metcalf | H04L 65/613 370/474 |
| 2022/0291976 A1 * | 9/2022 | Goel | G06F 9/526 |

\* cited by examiner

DEVICE AND METHOD FOR SHARING RESOURCE VIA BUS

CROSS-REFERENCE TO RELATED APPLICATION

This application is based on and claims priority under 35 U.S.C. § 119 to Korean Patent Application No. 10-2021-0040543, filed on Mar. 29, 2021 in the Korean Intellectual Property Office, the disclosure of which is incorporated by reference herein in its entirety.

TECHNICAL FIELD

The inventive concept relates to a bus, and more particularly, to a device and method for sharing a resource via a bus.

DISCUSSION OF RELATED ART

Systems may include a plurality of function blocks for providing various functions and high performance. Each of the function blocks may be configured or programmed to perform certain operations, and to communicate with other function blocks. When two or more function blocks need to simultaneously use one resource, one function block of the two or more function blocks may be selected and given access to the resource and the other unselected function blocks may wait until the selected function block completes usage of the resource.

SUMMARY

In some cases, a function block in a system may request and use a resource while other function blocks wait for permission to access the resource. This permission may be managed using, for example, a semaphore. However, in some comparative examples, there is no management in place to ensure the other function blocks do not wait a large amount of time for the resource. This may cause an error and/or a decrease in performance of the system.

The inventive concept provides a device and method for safely and efficiently sharing a resource of a system.

According to an aspect of the inventive concept, a device configured to provide an interface between a plurality of master devices and a slave device includes: a first timer configured to begin timing when a first access request is received from a first master device via a bus, and to be reset when a semaphore is allocated to the first master device; a second timer configured to begin timing when a second access request is received from a second master device via the bus, and to be reset when a semaphore is allocated to the second master device; and a controller configured to provide a first message to the first master device via the bus when a first expiration interval is measured by the first timer, and provide the first message to the second master via the bus when a second expiration interval is measured by the second timer.

According to another aspect of the inventive concept, a method for providing an interface between a plurality of master devices and a slave device includes: when an access request is received from a first master device via a bus, starting a first timer that corresponds to the first master device from among a plurality of timers respectively corresponding to the plurality of master devices; when a semaphore is allocated to the first master device, resetting the first timer; and when a first expiration interval that corresponds to the first master device from among a plurality of expiration intervals respectively corresponding to the plurality of master devices is measured by the first timer, providing a first message to the first master device via the bus.

According to another aspect of the inventive concept, a device that provides an interface between a plurality of master devices and a slave device includes: a plurality of timers respectively corresponding to the plurality of master devices; and a controller configured to allocate a semaphore to the plurality of master devices, wherein each of the plurality of timers is configured to begin timing when an access request is received from a master device corresponding to each of the plurality of times via a bus, and to be reset when a semaphore is allocated to the master device, where the controller is configured to provide a first message via the bus to a master device that corresponds to a timer with an expiration interval that has been measured, based on a plurality of expiration intervals respectively corresponding to the plurality of master devices.

BRIEF DESCRIPTION OF THE DRAWINGS

The above and other aspects, features, and advantages of the present inventive concept will be more clearly understood from the following detailed description with reference to the accompanying drawings, in which.

DETAILED DESCRIPTION OF THE EMBODIMENTS

Figure 1:
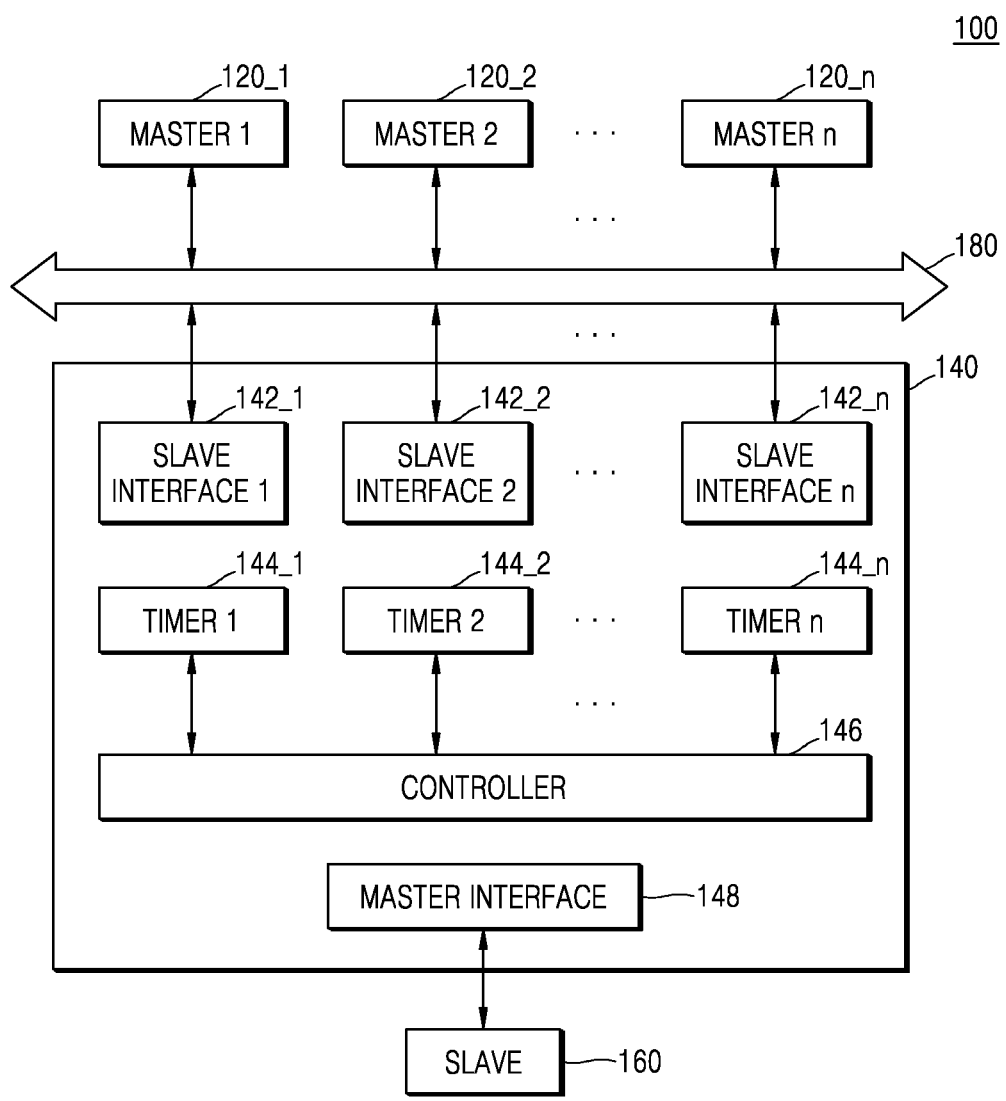
FIG. 1 is a block diagram of a system according to an embodiment.

Hereinafter, example embodiments will be described in detail with reference to the accompanying drawings Like reference numerals may refer to like components, and to the extent that a description of an element has been omitted, it may be understood that the element is at least similar to corresponding elements that are described elsewhere in the specification.

FIG. 1 is a block diagram of a system 100 according to an example embodiment. Blocks illustrated in the diagrams attached herein may be variously implemented in different embodiments. For example, a block may include any one of programmable devices such as a central processing unit (CPU), a graphics processing unit (GPU), and a neural processing unit (NPU), and an intellectual property (IP) core designed to perform a fixed function and/or a reconfigurable device such as a field programmable gate array (FPGA). In addition, the block may include a software module which is configured to be executed by a programmable device and includes a series of instructions.

The system 100 may similarly be variously implemented in different embodiments. For example, the system 100 may include a computing system such as a server, a personal computer, a smartphone, a wearable device, and a tablet personal computer (PC), or a vehicle such as an aircraft, an automobile, a ship, a motorized scooter, and a drone, or a home appliance such as a TV set, a refrigerator, and a washing machine, or may be a component included in the above-described things. In some embodiments, the system 100 may include at least one chip manufactured by using a semiconductor process. For example, the system 100 may include a system-on-chip (SoC) in which components illustrated in FIG. 1 are included in one chip, or may include two or more chips mounted on a board. As illustrated in FIG. 1, the system 100 may include first through $n^{th}$ (where n is an integer greater than 1) masters 120_1 through 120_$n$, a resource sharing interface 140, a slave 160, and a bus 180.

The bus 180 may be connected to the first through $n^{th}$ masters 120_1 through 120_$n$ and the resource sharing interface 140, and the first through $n^{th}$ masters 120_1 through 120_$n$ and the resource sharing interface 140 may communicate with each other via the bus 180. The bus 180 may be referred to as a system bus, a bus matrix, or the like, and may be implemented in various ways. For example, the bus 180 may include a bus based on advanced microcontroller bus architecture (AMBA) such as advanced extensible interface (AXI), advanced high-performance bus (AHB), and advanced peripheral bus (APB), a parallel bus such as advanced technology attachment (ATA) and integrated drive electronics (IDE), a serial bus such as peripheral component interconnect express (PCIe), inter-integrated circuit (I2C), system management bus (SMBus), a controller area network (CAN) bus, universal serial bus (USB), and/or a serial advanced technical attachment (SATA).

Each of the first through $n^{th}$ masters 120_1 through 120_$n$ may be connected to the bus 180, and may initiate transactions via the bus 180. Each of the first through $n^{th}$ masters 120_1 through 120_$n$ may include a CPU, a direct memory access (DMA) controller, etc. Each of the first through $n^{th}$ masters 120_1 through 120_$n$ may access the slave 160 via the bus 180 and the resource sharing interface 140. For example, each of the first through $n^{th}$ masters 120_1 through 120_$n$ may provide an access request for the slave 160, for example, a write request or a read request, via the bus 180 to the resource sharing interface 140. In some embodiments, at least one of the first through $n^{th}$ masters 120_1 through 120_$n$ may execute software such as firmware, an operating system, and an application. In the present disclosure, each of the first through $n^{th}$ masters 120_1 through 120_$n$ may be referred to as a bus master or master device. In some embodiments, the system 100 may further include at least one master which is connected to the bus 180 but does not access the slave 160.

The slave 160 may variously implemented in different embodiments. The slave 160 may be configured to perform designed and/or programmed operations. For example, the slave 160 may include a device providing connection for another system, such as WiFi, Bluetooth, I2C, and integrated inter-chip sound (I2S). The slave 160 may respond to a request from each of the first through $n^{th}$ masters 120_1 through 120_$n$. For example, the slave 160 may generate a response based on an access request provided by each of the first through $n^{th}$ masters 120_1 through 120_$n$ via the resource sharing interface 140, and may provide the response to each of the first through $n^{th}$ masters 120_1 through 120_$n$ via the resource sharing interface 140. Herein, the slave 160 may be referred to as a bus slave, or a slave device. In some embodiments, the system 100 may further include a slave shared by two or more masters.

The resource sharing interface 140 may be connected to the bus 180, and provide interfaces between the first through $n^{th}$ masters 120_1 through 120_$n$ and the slave 160. For example, the resource sharing interface 140 may receive an access request for the slave 160 from one or more of the first through $n^{th}$ masters 120_1 through 120_$n$, and provide a response received from the slave 160 to the corresponding master(s) of the first through $n^{th}$ masters 120_1 through 120_$n$. Herein, the resource sharing interface 140 may be referred to as an interface device, an interface, or simply a device. As illustrated in FIG. 1, the resource sharing interface 140 may include first through $n^{th}$ slave interfaces 142_1 through 142_$n$, first through $n^{th}$ timers 144_1 through 144_$n$, a controller 146, and a master interface 148.

The first through $n^{th}$ slave interfaces 142_1 through 142_$n$ may communicate with the first through $n^{th}$ masters 120_1 through 120_$n$ via the bus 180, respectively. For example, the first through $n^{th}$ slave interfaces 142_1 through 142_$n$ may each include at least one register and each have the ability to write a value in the register or provide a value stored in the register to the master according to a request of a master. Similarly, the master interface 148 may communicate with the slave 160 and include at least one register. In some embodiments, the master interface 148 and the slave 160 may communicate with each other based on a protocol identical to that of the bus 180. The number (e.g., n) of slave interfaces included in the resource sharing interface 140 may be the same as the number of masters. For example, the number of slave interfaces may be the same as the number of masters which are able to access the slave 160, that is, share the slave 160, from among the masters included in the system 100.

The first through $n^{th}$ timers 144_1 through 144_$n$ may each correspond to each of the first through $n^{th}$ masters 120_1 through 120_$n$, respectively, and each of the first through $n^{th}$ timers 144_1 through 144_$n$ may measure an elapsed time. For example, each of the first through $n^{th}$ timers 144_1 through 144_$n$ may measure an elapsed time after a time point at which an access request from a master corresponding to itself has been received. In some embodiments, each of the first through $n^{th}$ timers 144_1 through 144_$n$ may include counters which receive a common clock signal. The timers may also be implemented in various ways according to different embodiments. For example, the timers may be timer circuits, or may be a timer program executed by one or more of the components of the system 100. The number (e.g., n) of slave timers included in the resource sharing interface 140 may be the same as the number of masters. For example, the number of slave timers may be the same as the number of masters which are able to access the slave 160, that is, share the slave 160, from among the masters included in the system 100.

The controller 146 may schedule access the slave 160 by other components. For example, as illustrated in FIG. 1, when the slave 160 is shared by the first through $n^{th}$ masters 120_1 through 120_$n$, the controller 146 may select one master among the masters trying to access the slave 160, and while the selected one master accesses the slave 160, the controller 146 may block access to the slave 160 by the other masters. The master allowed with an access to the slave 160 by the controller 146 may be referred to as a master having obtained a semaphore, and the master having obtained the semaphore may release the semaphore after an access to the slave 160 is completed. For example, the controller 146 may allocate a semaphore to one master among the first through $n^{th}$ masters 120_1 through 120_n. In some embodiments, the semaphore may be a data structure that allows multiple masters access to the slave 160, and accordingly, the controller 146 may provide access to the slave 160 to multiple masters. In some embodiments, the semaphore may be referred to as an access token.

As illustrated in FIG. 1, the controller 146 may communicate with the first through $n^{th}$ masters 120_1 through 120_n, and may schedule access to the slave 160 by using the first through $n^{th}$ timers 144_1 through 144_n so that a delay and/or an error due to a master having not obtained a semaphore is prevented.

In a comparative example, when the first master 120_1 obtains a semaphore, the second master 120_2 may wait until the first master 120_1 releases the semaphore. When the second master 120_2 continuously waits due to the delay of the release of the semaphore by the first master 120_1, a delay and/or an error may occur in an operation of the second master 120_2. For example, when an access to the slave 160 is delayed longer than a pre-defined period of time, software operating the second master 120_2 may enter a mode for processing an error in communication via the bus 180 (e.g., a debugging mode). In some cases, it is not desirable for a master to enter a debugging mode, as this may interrupt a software or application from normal operation by a user.

In an example operation according to the present disclosure, when the second master 120_2 continuously waits due to the delay of the release of the semaphore, the controller 146 may identify whether a delay time of a master having not obtained a semaphore exceeds a certain time (e.g., an expiration interval) by using the first through $n^{th}$ timers 144_1 through 144_n, and provide a message to the master so that the master identifies termination of a process for the access request. The message may include a response to the access request, and include information indicating that obtaining of a semaphore has failed. Accordingly, the master may not enter the debugging mode, and based on the message provided by the resource sharing interface 140, may instead perform another operation or provide another an access request for the slave 160 to the resource sharing interface 140. Accordingly, users operating systems according to embodiments of the present disclosure such as system 100 may not be interrupted.

In some embodiments, the controller 146 may use the first through $n^{th}$ timers 144_1 through 144_n to select a master to which a semaphore is to be allocated. For example, when the semaphore has been released, the controller 146 may allocate a priority to a master that has been waiting a relatively long time. Accordingly, in the system 100, a delay and/or an error may be prevented when a resource (e.g., the slave 160) is shared by the first through $n^{th}$ masters 120_1 through 120_n, and the performance and reliability of the system 100 may be increased. In addition, due to a protocol of the disclosure for obtaining a semaphore, an efficiency of resource sharing in the system 100 may be increased.

Figure 2:
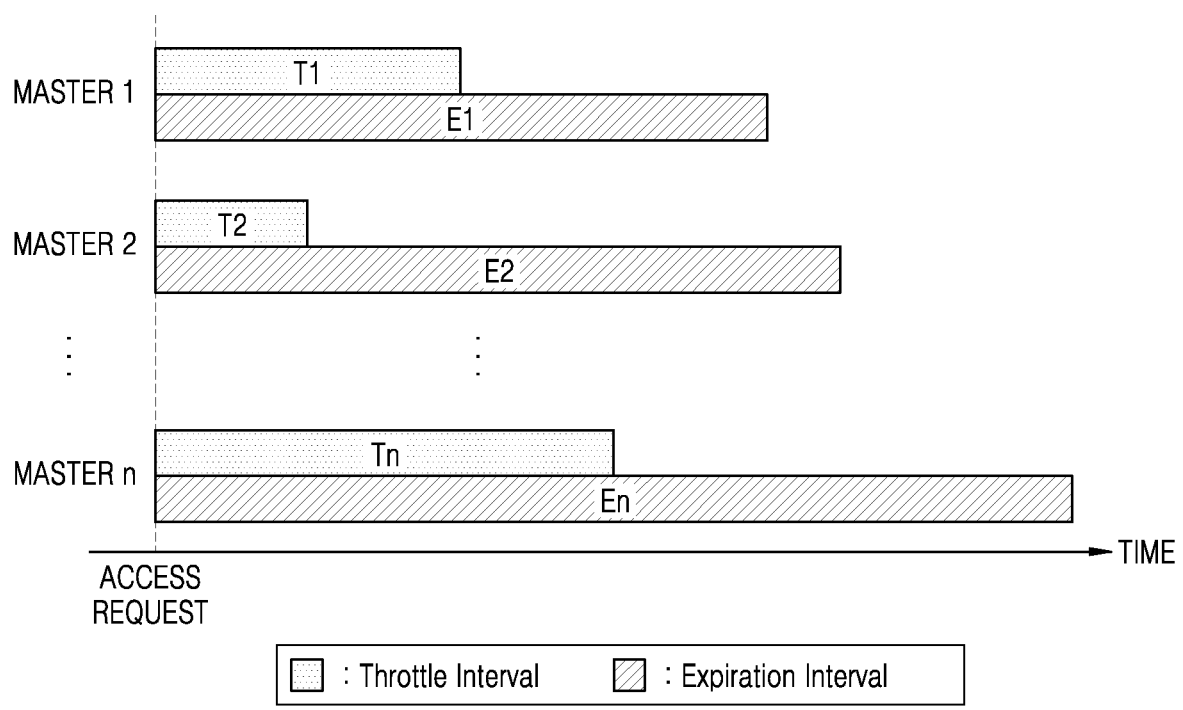
FIG. 2 illustrates diagrams of examples of throttle intervals and expiration intervals of masters, according to an example embodiment.

FIG. 2 illustrates diagrams of examples of throttle intervals and expiration intervals of masters, according to an example embodiment. FIG. 2 illustrates first through $n^{th}$ throttle intervals T1 through Tn and first through $n^{th}$ expiration intervals E1 through En, which respectively correspond to first through $n^{th}$ masters. Below, the first through $n^{th}$ masters in FIG. 2 may be assumed to be the first through $n^{th}$ masters 120_1 through 120_n in FIG. 1, and descriptions of FIG. 2 will be given with reference to FIG. 1.

In some embodiments, a master may have a unique expiration interval. The expiration interval may be measured by a timer corresponding to the master, and when a semaphore is not obtained in the expiration interval, the controller 146 may provide a message indicating termination of an access request. For example, the first timer 144_1 corresponding to the first master 120_1 may be set to measure the first expiration interval E1, and may be reset when a semaphore is allocated to the first master 120_1 during the first expiration interval E1. As illustrated in FIG. 2, the first through $n^{th}$ expiration intervals E1 through En which respectively correspond to the first through $n^{th}$ masters 120_1 through 120_n may be the same as or different from each other. For example, the first master 120_1 may have the first expiration interval E1, and the second master 120_2 may have the second expiration interval E2 longer than the first expiration interval E1.

In some embodiments, a master may have a unique throttle interval. The throttle interval may be measured by a timer corresponding to the master, and may be shorter than an expiration interval. When the semaphore is not obtained in the throttle interval, the controller 146 may preferentially allocate a semaphore to the master. For example, when the semaphore is not obtained by the master in the throttle interval, the controller 146 may assign priority to the master for the semaphore. For example, when the first throttle interval T1 elapsed from a time point at which an access request is received from the first master 120_1, the controller 146 may preferentially allocate a semaphore, that has been released, to the first master 120_1. In some embodiments, when a throttle interval is measured by a timer, the controller 146 may provide a message for informing expiration of the throttle interval.

In some embodiments, a non-volatile memory which stores information about the first through $n^{th}$ expiration intervals E1 through En and the first through $n^{th}$ throttle intervals T1 through Tn may be included in or accessed by the resource sharing interface 140, and the first through $n^{th}$ timers 144_1 through 144_n may be set based on information stored in the non-volatile memory or information stored in a volatile memory into which information from a non-volatile memory has been loaded, for example, when the system 100 boots.

Figure 3:
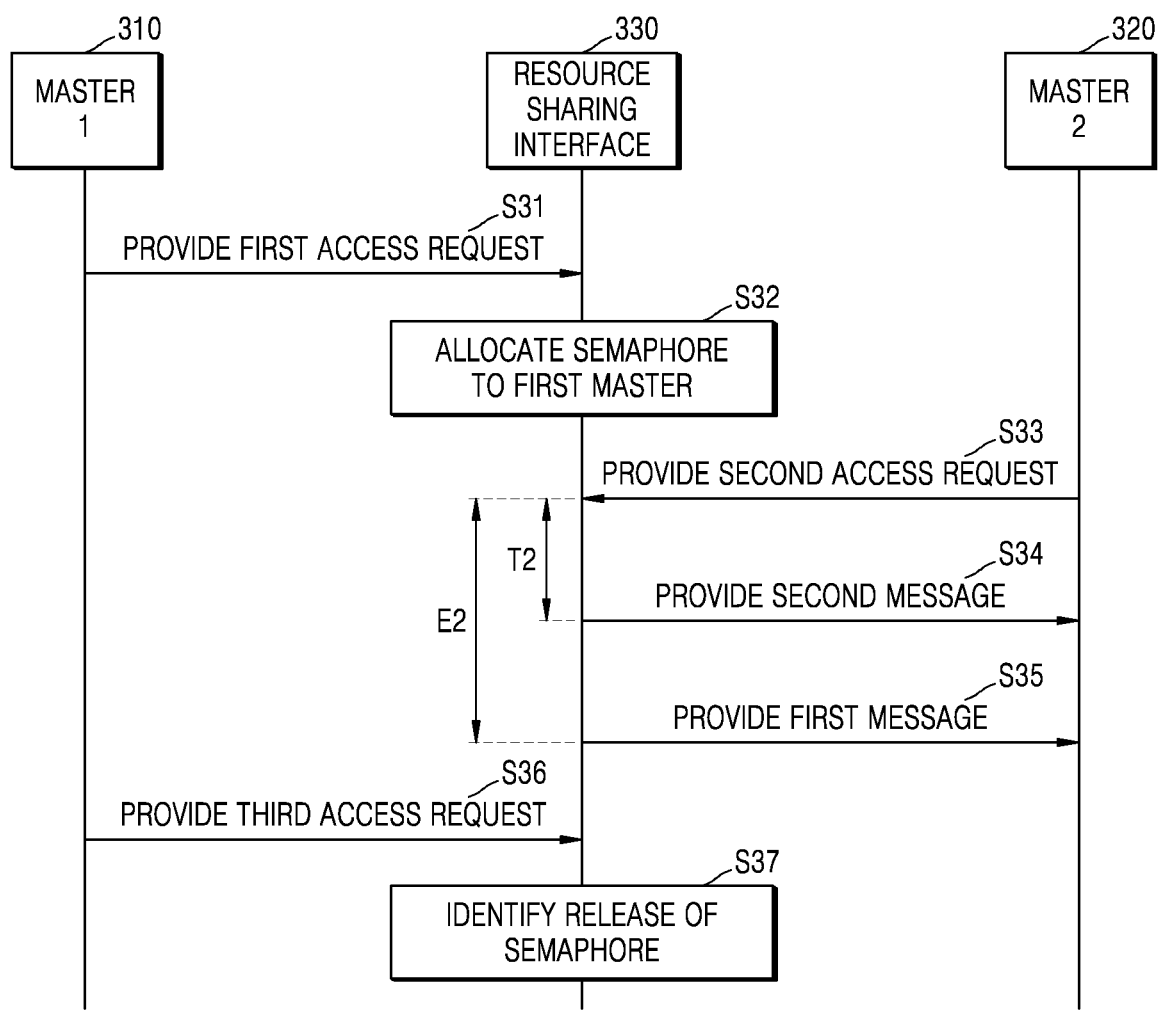
FIG. 3 is a message diagram of a method for sharing a resource, according to an example embodiment.

FIG. 3 is a message diagram of a method for sharing a resource, according to an example embodiment. The message diagram of FIG. 3 illustrates example operations between first and second masters 310 and 320 and a resource sharing interface 330 over time. Hereinafter, the resource sharing interface 330 in FIG. 3 may be assumed to include components included in the resource sharing interface 140 in FIG. 1.

Referring to FIG. 3, in operation S31, the first master 310 may provide a first access request to the resource sharing interface 330. For example, the first master 310 may provide the first access request to the resource sharing interface 330 to obtain a semaphore for accessing a resource, such as the slave 160 of FIG. 1. As described above with reference to FIG. 1, the first access request may be provided to the resource sharing interface 330 via the bus 180, and the first slave interface 142_1 that is included in the resource sharing interface 330 and corresponds to the first master 310 may receive the first access request.

In operation S32, the resource sharing interface 330 may allocate a semaphore to the first master 310. For example, the controller 146 included in the resource sharing interface 330 may determine whether it is possible to allocate a semaphore (or whether a semaphore has been released) in response to the first access request. When it is possible to allocate a semaphore, the controller 146 may allocate a semaphore to the first master 310, and the first master 310 having obtained a semaphore may access a slave via the resource sharing interface 330.

In operation S33, the second master 320 may provide a second access request to the resource sharing interface 330. For example, the second master 320 may provide the second access request to the resource sharing interface 330 to obtain a semaphore for accessing a slave. As described above with reference to FIG. 1, the second access request may be provided to the resource sharing interface 330 via the bus 180. The second slave interface 142_2, that is included in the resource sharing interface 330 and corresponds to the second master 320, may receive the second access request. As the semaphore is already allocated to the first master 310, the controller 146 included in the resource sharing interface 330 may not allocate a semaphore to the second master 320, and the second timer 144_2 corresponding to the second master 320 may be started.

In operation S34, the resource sharing interface 330 may provide a second message to the second master 320. For example, the controller 146 included in the resource sharing interface 330 may provide the second message to the second master 320 via the second slave interface 142_2. As illustrated in FIG. 3, after a second throttle interval T2 has elapsed after the controller 146 received the second access request from the second master 320, the controller 146 may provide the second message to the second master 320. The second message may indicate to the second master 320 that obtaining of a semaphore is awaited and a throttle interval has elapsed. In some embodiments, the second message may cause an interruption in software operating the second master 320.

In operation S35, the resource sharing interface 330 may provide a first message to the second master 320. For example, the controller 146 included in the resource sharing interface 330 may provide the first message to the second master 320 via the second slave interface 142_2. As illustrated in FIG. 3, after a second expiration interval E2 has elapsed after the second access request is received from the second master 320, the controller 146 may provide the first message to the second master 320. The controller 146 may terminate processing of the second access request received in operation S33, and the first message may indicate to the second master 320 that the second access request has been terminated. In addition, the second master 320 may identify a failure of obtaining a semaphore based on information included in the first message. Accordingly, the second master 320 may be prevented from waiting for obtaining of a semaphore until the first master 310 releases the semaphore, and a delay and/or an error in operations of the second master 320 may be prevented. For example, in the above described case, the second master 320 might not wait for the semaphore for an extended period of time longer than the second expiration interval E2, and may be free to continue other operations.

In operation S36, the first master 310 may provide a third access request to the resource sharing interface 330. For example, when an access to a slave is completed, the first master 310 may provide the third access request to the resource sharing interface 330 for release of the semaphore. The third access request may have a format similar to those of the above-described first access request and second access request, and accordingly, an additional protocol for release of a second access request may be omitted, and thus, an efficiency of resource sharing may be increased due to a simple protocol for sharing a resource. An example of the third access request for release of the semaphore will be described later with reference to FIG. 9.

In operation S37, the resource sharing interface 330 may identify release of a semaphore. For example, the controller 146 may identify the third access request via the first slave interface 142_1, and may identify release of a semaphore by the first master 310 based on the third access request. In some embodiments, the first slave interface 142_1 may identify the third access request, and provide a signal indicating release of the semaphore to the controller 146.

Figure 4:
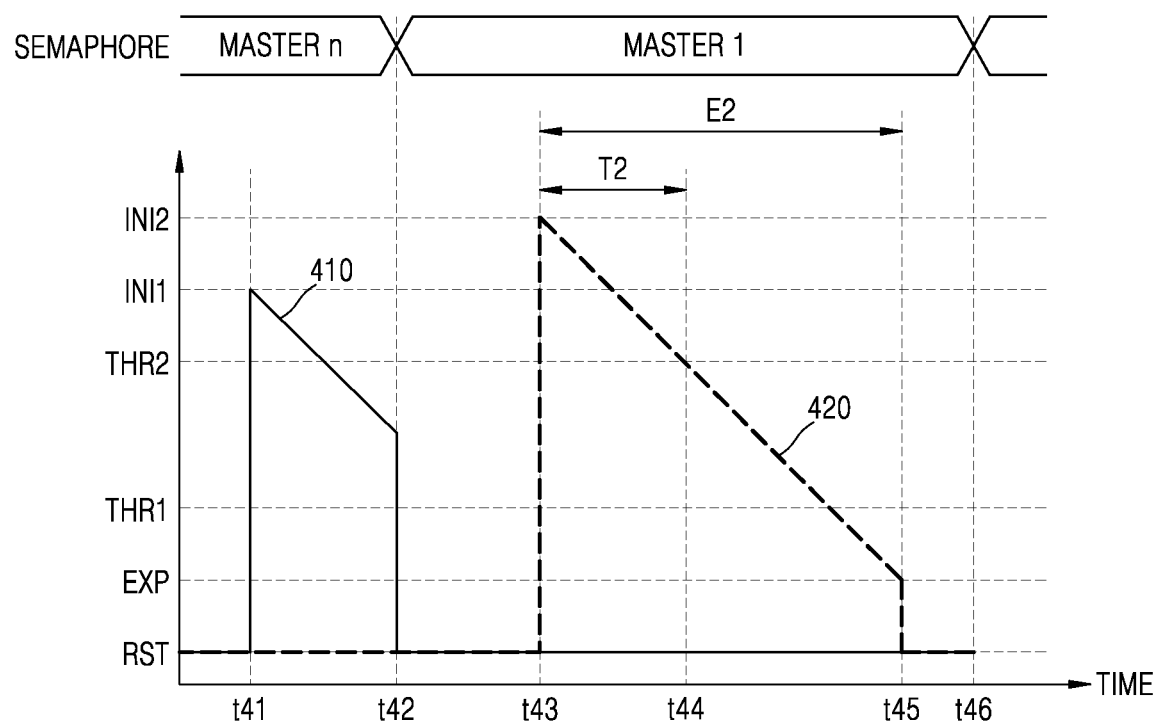
FIG. 4 is a diagram that illustrates an example operation for sharing a resource, according to an example embodiment.

FIG. 4 is a diagram that illustrates an example operation for sharing a resource, according to an example embodiment. An upper portion in FIG. 4 indicates a timing diagram of masters to which a semaphore is allocated, and a lower portion in FIG. 4 indicates values 410 of the first timer 144_1 in FIG. 1 and values 420 of the second timer 144_2 in FIG. 1. Hereinafter, FIG. 4 will be described with reference to FIG. 1.

In some embodiments, each of the first through $n^{th}$ timers 144_1 through 144_$n$ included in the resource sharing interface 140 may include a down-counter. For example, as illustrated in FIG. 4, the value of the first timer 144_1 may be decreased from a first initial value INI1, and the value of the second timer 144_2 may be decreased from a second initial value INT2. For example, each of the first through $n^{th}$ timers 144_1 through 144_$n$ may have respective initial values, which might or might not be different. In some embodiments, unlike as illustrated in FIG. 4, each of the first through $n^{th}$ timers 144_1 through 144_$n$ may include an up-counter, and a value of each of the first through $n^{th}$ timers 144_1 through 144_$n$ may increase from an initial value. The up-counter may be implemented in various ways; for example, the up-counter may also be a counting circuit or a counting program executed by a processor.

As described above with reference to FIG. 2, the first timer 144_1 may be used to measure the first throttle interval T1 and the first expiration interval E1, and the second timer 144_2 may be used to measure the second throttle interval T2 and the second expiration interval E2. For example, if and when the value of the first timer 144_1 is decreased from the first initial value INI1 to a first threshold value THR1, the first throttle interval T1 may be measured, and when the value 410 of the first timer 144_1 is decreased from the first initial value INI1 to an expiration value EXP, the first expiration interval E1 may be measured. In addition, when the value of the second timer 144_2 is decreased from a second initial value INI2 to a second threshold value THR2, the second throttle interval T2 may be measured, and when the value 420 of the second timer 144_2 is decreased from the second initial value INT2 to the expiration value EXP, the second expiration interval E2 may be measured. For example, as used herein, when an interval is said to be "measured", this may indicate that the time taken for the down-counter (or up-counter) of the timer to change from one value to another may be defined as a throttle interval or an expiration interval, depending on the design of the specific embodiment. Accordingly, upon reaching these intervals, messages may be sent to the masters regarding the status of the semaphore as described above.

Referring to FIG. 4, the first timer 144_1 may be set to the first initial value INI1 at a time point t41. For example, as illustrated in FIG. 4, when an access request for obtaining a semaphore is received from the first master 120_1 in a state where the semaphore has been allocated to the $n^{th}$ master 120_n, the first timer 144_1 may be set to the first initial value INI1 for measuring the first throttle interval T1 and the first expiration interval E1, and the value 410 of the first timer 144_1 may begin to decrease from the first initial value INI1.

At a time point t42, the first timer 144_1 may be reset. For example, the n$^{th}$ master 120_n may release a semaphore at the time point t42, and the controller 146 may allocate the released semaphore to the first master 120_1. In addition, the controller 146 may reset the first timer 144_1, and as illustrated in FIG. 4, the value 410 of the first timer 144_1 may be set to a reset value RST. In some embodiments, the expiration value EXP may be same as the reset value RST, for example, they may both be zero. In some embodiments, unlike as illustrated in FIG. 4, the first timer 144_1 may be reset to have the first initial value INI1, and accordingly, may have the first initial value INI1 instead of the reset value RST before the time point t41 and after a time point t42. In some embodiments, unlike as illustrated in FIG. 4, the first timer 144_1 may be disabled instead of reset, and in this way, may also continuously maintain a certain value.

At a time point t43, the second timer 144_2 may be reset to the second initial value INI2. For example, as illustrated in FIG. 4, when an access request for obtaining a semaphore is received from the second master 120_2 during a system state in which the semaphore has been allocated to the first master 120_1, the second timer 144_2 may be set to the second initial value INI2 for measuring the second throttle interval T2 and the second expiration interval E2, and the value 420 of the second timer 144_2 may begin to decrease from the second initial value INI2.

At a time point t44, the second throttle interval T2 may be measured. For example, as illustrated in FIG. 4, the value 420 of the second timer 144_2 may reach the second threshold value THR2, and accordingly, the controller 146 may identify that the second throttle interval T2 has been measured. In some embodiments, as described above with reference to FIG. 3, the controller 146 may provide a message to the second master 120_2 via the second slave interface 142_2, and the second master 120_2 may identify elapse of the second throttle interval T2. In some embodiments, as described later with reference to FIG. 5, the controller 146 may give priority to the second master 120_2, which has waited during the second throttle interval T2, and the priority may be considered at a time when the released semaphore is allocated.

At a time point t45, the second expiration interval E2 may be measured. For example, as illustrated in FIG. 4, the value 420 of the second timer 144_2 may reach the expiration value EXP, and accordingly, the controller 146 may identify that the second expiration interval E2 has been measured. In some embodiments, as described above with reference to FIG. 3, the controller 146 may terminate processing of an access request received from the second master 120_2 at the time point t43, and provide a message indicating completion of the processing to the second master 120_2 via the second slave interface 142_2. Accordingly, the second master 120_2 may identify termination of processing of the access request at the time point t43 based on the message provided from the resource sharing interface 140, and may terminate waiting for the semaphore. The controller 146 may reset the second timer 144_2, and the value 420 of the second timer 144_2 may have the reset value RST. In some embodiments, unlike as illustrated in FIG. 4, the second timer 144_2 may be reset to have the second initial value INI2, and accordingly, may have the second initial value INI2 instead of the reset value RST before the time point t43 and after the time point t45.

In some embodiments, unlike as illustrated in FIG. 4, the second timer 144_2 may be disabled instead of being reset, and accordingly, may also maintain a certain value.

Figure 5:
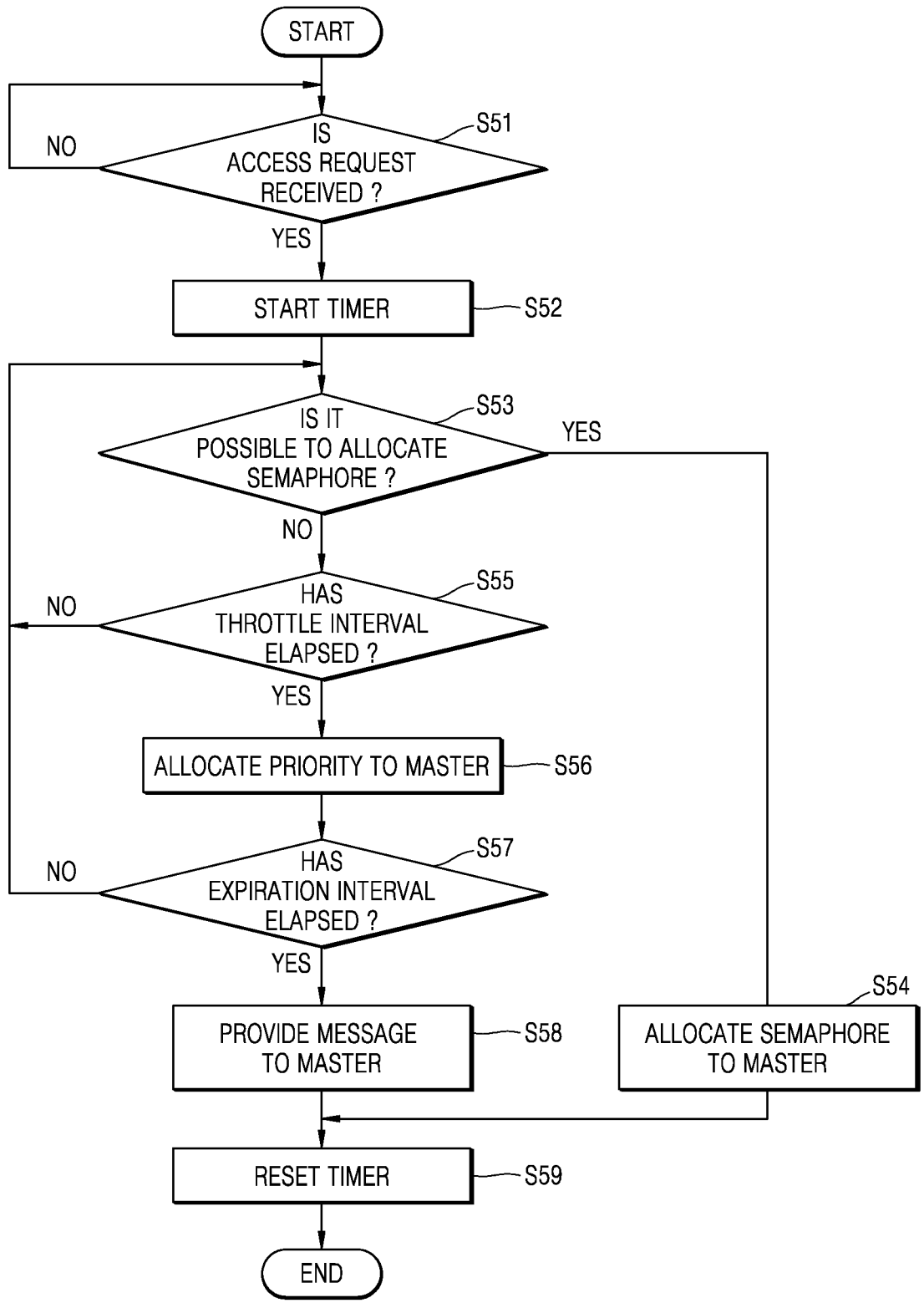
FIG. 5 is a flowchart of a method of sharing a resource, according to an example embodiment.

FIG. 5 is a flowchart of a method of sharing a resource, according to an example embodiment. As illustrated in FIG. 5, a method of sharing a resource may include a plurality of operations S51 through S59. In some embodiments, the method of FIG. 5 may be performed by the controller 146 included in the resource sharing interface 140 in FIG. 1, and hereinafter, FIG. 5 will be described with reference to FIGS. 1 and 4.

Referring to FIG. 5, in operation S51, it may be determined whether or not an access request has been received. For example, the controller 146 may identify that an access request for obtaining a semaphore is received from the first master 120_1 via the first slave interface 142_1. As illustrated in FIG. 5, when an access request is received from the first master 120_1, operation S52 may be subsequently performed.

In operation S52, a timer may be initiated. For example, when an access request from the first master 120_1 to the first slave interface 142_1 is received, the first timer 144_1 may be started. In some embodiments, as described above with reference to FIG. 4, the first timer 144_1 may include the down-counter, and the value 410 of the first timer 144_1 may begin to decrease from the first initial value INI1. In some embodiments, unlike as illustrated in FIG. 5, the first timer 144_1 may be initiated when it has been determined impossible to allocate a semaphore to the first master 120_1.

In operation S53, it may be determined whether or not it is possible to allocate a semaphore. For example, when the semaphore is not allocated to the second through n$^{th}$ masters 120_2 through 120_n, it may be determined that it is possible to allocate a semaphore to the first master 120_1. As illustrated in FIG. 5, when it is possible to allocate a semaphore to the first master 120_1, operation S54 may be subsequently performed, but when it is not possible to allocate a semaphore to the first master 120_1, operation S55 may be subsequently performed.

In operation S54, a semaphore may be allocated to a master. For example, the controller 146 may allocate a semaphore to the first master 120_1, and accordingly, the first master 120_1 may access the slave 160 via the resource sharing interface 140. As illustrated with reference to FIG. 5, subsequent to operation S54, operation S59 to be described later may then be performed.

In operation S55, when it is impossible to allocate a semaphore, whether or not a throttle interval has elapsed may be determined. For example, when the value 410 of the first timer 144_1 reaches the first threshold value THR1, the controller 146 may identify that the first throttle interval T1 has been measured. As illustrated in FIG. 5, if the throttle interval has not elapsed, operation S53 may be performed again, but if the throttle interval has elapsed, operation S56 may be subsequently performed.

In operation S56, priority may be allocated to a master. For example, when the first throttle interval T1 has elapsed, the controller 146 may preferentially allocate a semaphore to the first master 120_1 instead of at least one other master waiting for a semaphore. For example, when the first throttle interval T1 has elapsed, and before an expiration interval of the first master 120_1 has elapsed, the controller 146 may allocate a semaphore to the first master 120_1 when the semaphore is released. Accordingly, the first through n$^{th}$ throttle intervals T1 through Tn (or first through n$^{th}$ threshold values THR1 through THRn) respectively corresponding to the first through n$^{th}$ masters 120_1 through 120_n may be set based on the importance of operations that are respectively performed by the first through $n^{th}$ masters 120_1 through 120_n. When an operation performed by the second master 120_2 by accessing the slave 160 is more important than an operation performed by the first master 120_1 by accessing the slave 160, as illustrated in FIG. 2, the second throttle interval T2 may be shorter than the first throttle interval T1.

In operation S57, whether or not an expiration interval has elapsed may be determined. For example, when the value 410 of the first timer 144_1 reaches the expiration value EXP, the controller 146 may identify that the first expiration interval E1 has been measured. As illustrated in FIG. 5, if an expiration interval has not elapsed at this point (e.g., a state is between a throttle interval and an expiration interval), operation S53 may be performed again, but if an expiration interval has elapsed, operation S58 may be subsequently performed.

In operation S58, a message may be provided to a master. For example, the controller 146 may terminate processing for an access request received from the first master 120_1 in operation S51, and may provide a message indicating termination of the processing to the first master 120_1.

In operation S59, a timer may be reset. For example, the controller 146 may reset the first timer 144_1 initiated in operation S52, and accordingly, the first timer 144_1 may have the reset value RST (or the first initial value INI1).

Figure 6:
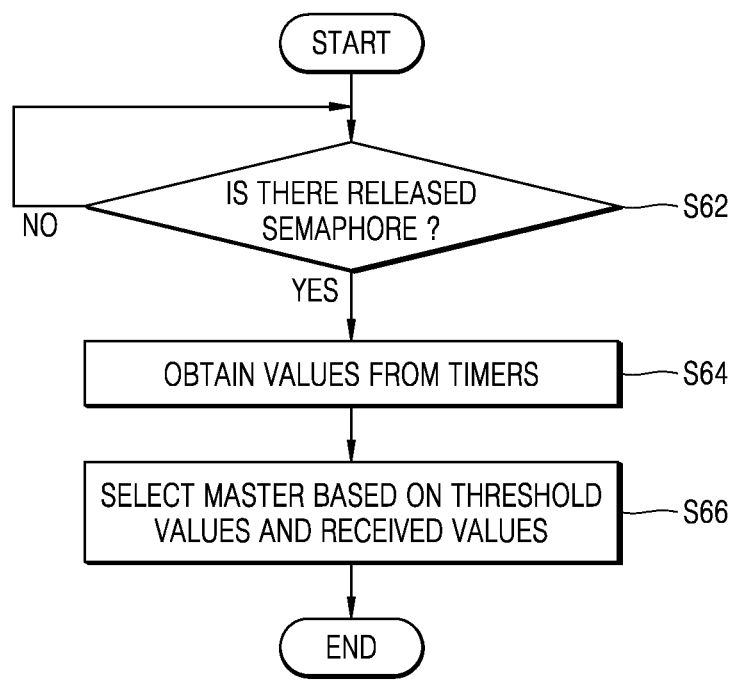
FIG. 6 is a flowchart of a method of sharing a resource, according to an example embodiment.

FIG. 6 is a flowchart of a method of sharing a resource, according to an example embodiment. The flowchart of FIG. 6 illustrates a method of allocating a semaphore to a master, that is, an example of semaphore scheduling. In some embodiments, the method of FIG. 6 may include an example of operation S53 in FIG. 5. As illustrated in FIG. 6, the method of allocating a semaphore to a master may include a plurality of operations S62, S64, and S66. In some embodiments, the method of FIG. 6 may be performed by the controller 146 in FIG. 1, and hereinafter, FIG. 6 will be described with reference to FIG. 1.

Referring to FIG. 6, in operation S62, whether there is a released (e.g., an available) semaphore may be determined. For example, when one master of the first through $n^{th}$ masters 120_1 through 120_n has obtained a semaphore, the controller 146 may perform operation S62 until the semaphore is released by the corresponding master. As illustrated in FIG. 6, when the semaphore has been released by a master, operation S64 may be subsequently performed.

In operation S64, values may be obtained from timers. For example, the controller 146 may receive values from timers that are in operation among the first through $n^{th}$ timers 144_1 through 144_n, that is, timers corresponding to masters having provided access requests for the slave 160 from among the first through $n^{th}$ masters 120_1 through 120_n. When the semaphore has been released in a state where one master has provided an access request for the slave 160, the semaphore may be allocated to the master. On the other hand, when the semaphore has been released in a state where two or more masters have provided access requests for the slave 160, the controller 146 may select a master from among the two or more masters to allocate the slave 160, and to this end, the controller 146 may make a selection based on values received from two or more timers. The controller 146 may identify the time that has elapsed from a time point at which an access request has been received, based on initial values and each of values obtained from the timers.

In operation S66, a master may be selected based on threshold values and the values received from the timers. For example, the controller 146 may select a master to which a semaphore is to be allocated, based on the values received from the timers in operation S64 and the threshold values respectively corresponding to the timers. As described above with reference to FIG. 5, when there is only one master corresponding to a elapsed throttle interval, the controller 146 may allocate a semaphore to a master that has provided a corresponding access request. On the other hand, when there are two or more masters corresponding to the elapsed throttle interval as described later with reference to FIG. 7A, or when there are no masters corresponding to the elapsed throttle interval as described later with reference to FIG. 7B, the controller 146 may select a master based on the threshold values and the values received from the timers. Examples of operation S66 will be described later with reference to FIGS. 7A and 7B.

Figure 7A:
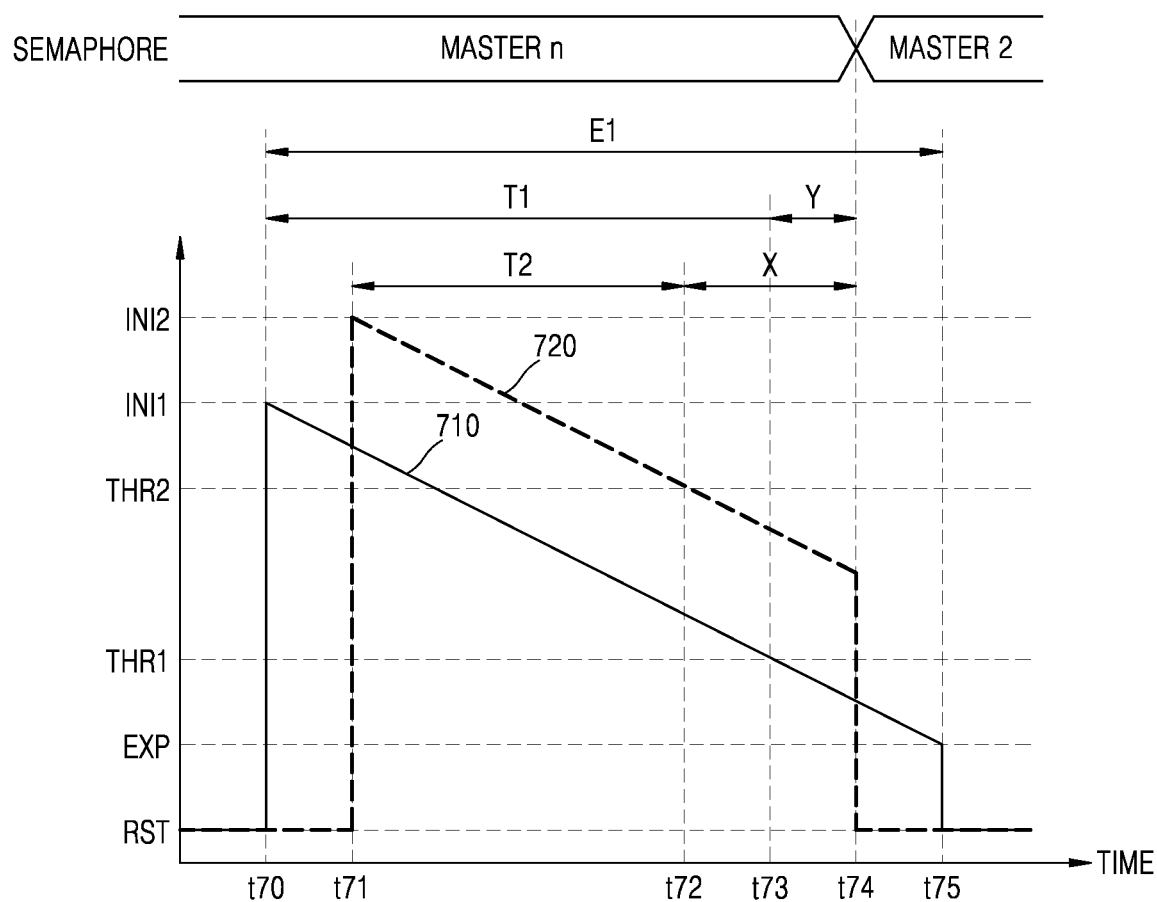
FIGS. 7A and 7B are diagrams of examples of operations for sharing a resource, according to example embodiments.
Figure 7B:
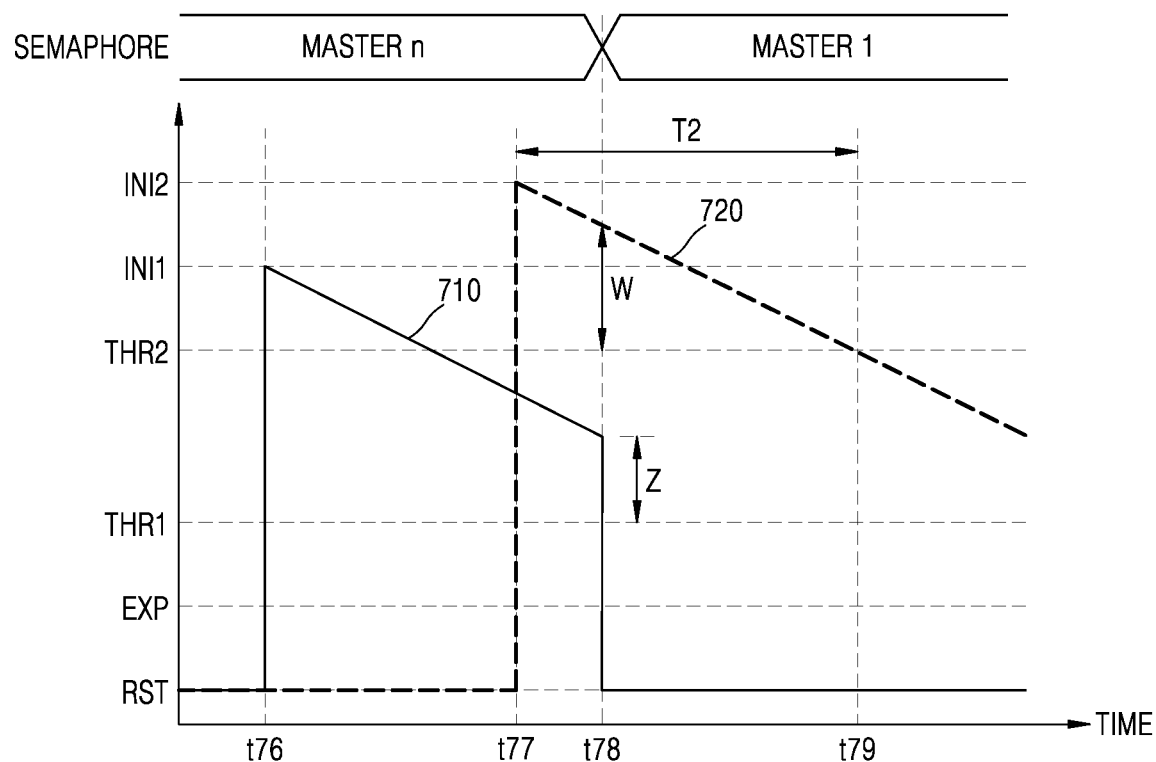

FIGS. 7A and 7B are diagrams of examples of operations for sharing a resource, according to example embodiments. Upper portions of FIGS. 7A and 7B are timing diagrams which indicate the masters to which a semaphore is allocated at a given time, and lower portions of FIGS. 7A and 7B are graphs of values 710 of the first timer 144_1 in FIG. 1 and values 720 of the second timer 144_2 over time. Although FIGS. 7A and 7B illustrate an operation of selecting one master of two masters, that is, the first and second masters 120_1 and 120_2, example embodiments of the inventive concept may be applicable to an operation of selecting one master of three or more masters. Hereinafter, duplicate descriptions of FIGS. 7A and 7B given with reference to FIG. 4 will be omitted.

Referring to FIG. 7A, at a time point t70, the first timer 144_1 may be set at the first initial value INI1. For example, as illustrated in FIG. 7A, when an access request for obtaining a semaphore is received from the first master 120_1 in a state where the semaphore has already been allocated to the $n^{th}$ master 120_n, the first timer 144_1 may be set to the first initial value INI1, and the value of the first timer 144_1 may begin to decrease from the first initial value INI1.

At a time point t71, the second timer 144_2 may be set to the second initial value INI2. For example, as illustrated in FIG. 7A, when an access request for obtaining a semaphore is received from the second master 120_2 in a state where the semaphore has already been allocated to the $n^{th}$ master 120_n, the second timer 144_2 may be set to the second initial value INI2, and the value of the second timer 144_2 may begin to decrease from the second initial value INI2.

At a time point t72, the second throttle interval T2 may be measured. For example, as illustrated in FIG. 7A, the value of the second timer 144_2 may reach the second threshold value THR2, and accordingly, the controller 146 may identify that the second throttle interval T2 has been measured.

At a time point t73, the first throttle interval T1 may be measured. For example, as illustrated in FIG. 7A, the value of the first timer 144_1 may reach the first threshold value THR1, and accordingly, the controller 146 may identify that the first throttle interval T1 has been measured.

At a time point t74, the second timer 144_2 may be reset. For example, the $n^{th}$ master 120_n may release a semaphore at the time point t74, and the controller 146 may allocate the released semaphore to the second master 120_2 from among the first and second masters 120_1 and 120_2. In some embodiments, the controller 146 may allocate a semaphore to a master in which a throttle interval has already elapsed. For example, as illustrated in FIG. 7A, the controller 146 may receive the values from the first and second timers 144_1 and 144_2 at the time point t74, and may identify an interval X and an interval Y based on the first and second initial values INI1 and INI2. For example, the controller 146 may have the initial values INI1 and INI2 and threshold values THR1 and THR2 stored in memory, and upon reading the values from the first and second timers 144_1 and 144_2, identify and/or determine an interval X and/or an interval Y has elapsed. As illustrated in FIG. 7A, the interval X corresponding to the second master 120_2 may be longer than the interval Y corresponding to the first master 120_1, and accordingly, the semaphore may be allocated to the second master 120_2. For example, in this case, the intervals X and Y may have starting points corresponding to the ending of the throttle intervals for the first and second masters 120_1 and 120_2. Since, in this case, the throttle interval of the first master 120_1 is designed to be longer than the throttle interval of the second master 120_2, the interval Y corresponding to the first master 120_1 may have begun later at the expiration of the longer throttle interval, and is therefore shorter than the interval X corresponding to the second master 120_2. Upon allocating the semaphore to the second master 120_2, the controller 146 may reset the second timer 144_2.

At a time point t75, the first expiration interval E1 may be measured. For example, as illustrated in FIG. 7A, the value of the first timer 144_1 may reach the expiration value EXP, and accordingly, the controller 146 may identify that the first expiration interval E1 has been measured. The controller 146 may reset the first timer 144_1.

Referring to FIG. 7B, at a time point t76, the first timer 144_1 may be set at the first initial value INI1. For example, as illustrated in FIG. 7A, when an access request for obtaining a semaphore is received from the first master 120_1 in a state where the semaphore has already been allocated to the $n^{th}$ master 120_$n$, the first timer 144_1 may be set to the first initial value INI1, and the value of the first timer 144_1 may begin to decrease from the first initial value INI1.

At a time point t77, the second timer 144_2 may be set to the second initial value INI2. For example, as illustrated in FIG. 7A, when an access request for obtaining a semaphore is received from the second master 120_2 in a state where the semaphore has already been allocated to the $n^{th}$ master 120_$n$, the second timer 144_2 may be set to the second initial value INI2, and the value of the second timer 144_2 may begin to decrease from the second initial value INI2.

At a time point t78, the first timer 144_1 may be reset. For example, the $n^{th}$ master 120_$n$ may release a semaphore at the time point t78, and the controller 146 may allocate the released semaphore to the first master 120_1 from among the first and second masters 120_1 and 120_2. In some embodiments, the controller 146 may allocate a semaphore to a master which is first to reach a throttle interval. For example, as illustrated in FIG. 7B, the controller 146 may receive the values 710 and 720 from the first and second timers 144_1 and 144_2 at the time point t78, and may identify a difference Z between the received value 710 and the first threshold value THR1 and a difference W between the received value 720 and the second threshold value THR2. As illustrated in FIG. 7B, the difference Z corresponding to the first master 120_1 may be less than the difference W corresponding to the second master 120_2, and accordingly, the semaphore may be allocated to the first master 120_1. For example, in this case, since the difference Z corresponding to the first master 120_1 is less than the difference W corresponding to the second master 120_2, this may indicate that the first master 120_1 was closer to reaching the threshold value THR1 and therefore closer to finishing its corresponding throttle interval than the second master 120_2. Upon allocating the semaphore to the first master 120_1, the controller 146 may reset the first timer 144_1.

At a time point t79, the second throttle interval T2 may be measured. For example, as illustrated in FIG. 7B, the value of the second timer 144_2 may reach the second threshold value THR2, and accordingly, the controller 146 may identify that the second throttle interval T2 has been measured.

Figure 8A:
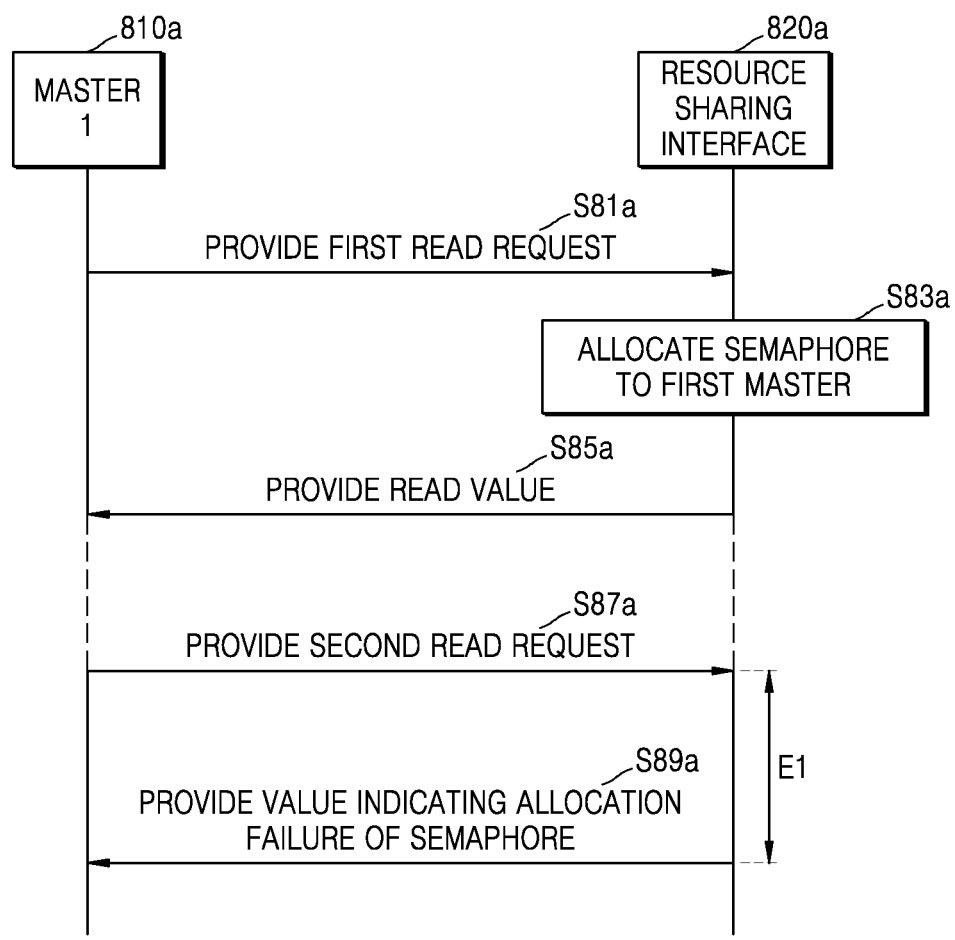
FIGS. 8A and 8B are message diagrams of methods of sharing a resource, according to example embodiments.
Figure 8B:
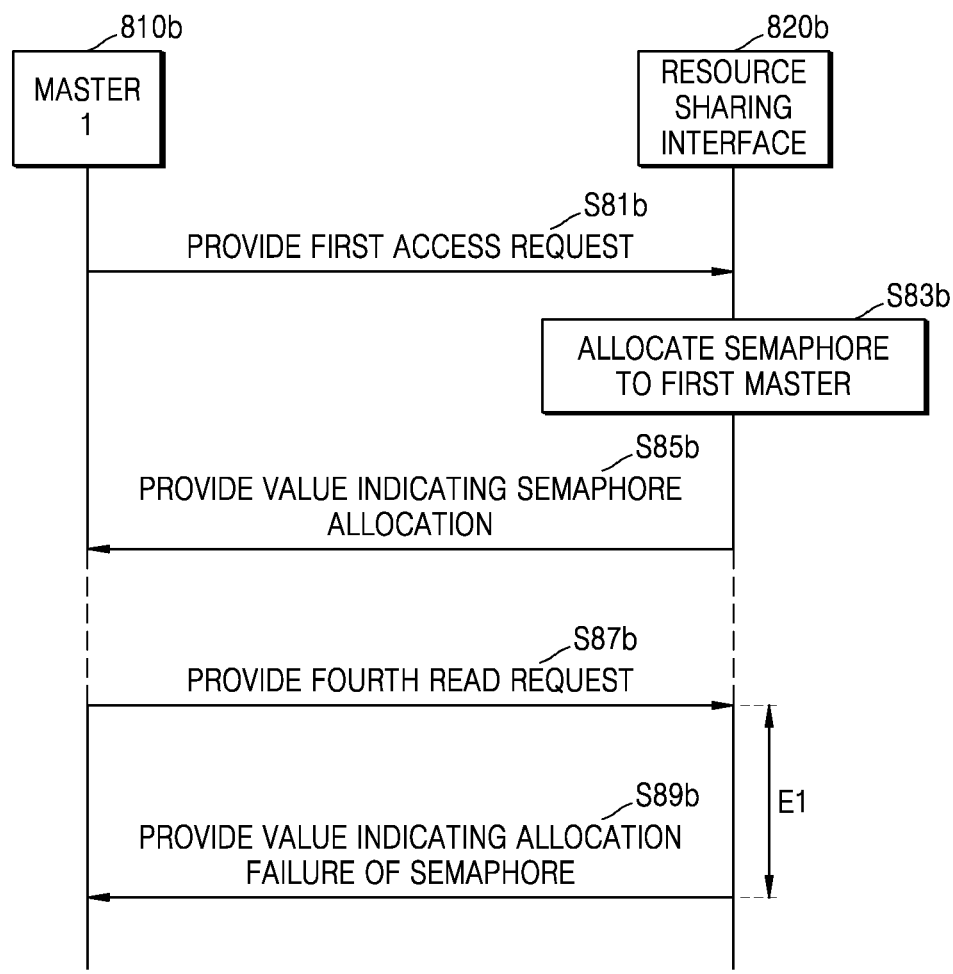

FIGS. 8A and 8B are message diagrams of methods of sharing a resource, according to example embodiments. The message diagrams of FIGS. 8A and 8B illustrate examples of an access request for obtaining a semaphore. Duplicate descriptions given with reference to FIGS. 8A and 8B will be omitted.

In some embodiments, a master may provide a read request for obtaining a semaphore to a resource sharing interface. A response to the read request may include a read value (or data) and a response to a write request may indicate completion of writing (e.g., writing a value). When the write request is used for obtaining a semaphore and a semaphore has not been obtained during an expiration interval, an additional protocol may be required so that the resource sharing interface transmits completion of processing for the write request to the master. On the other hand, when the read request has been used for obtaining a semaphore and a semaphore has not been obtained during the expiration interval, the resource sharing interface may provide, to the master, a message including a value different from a value normally read (e.g., the message may include a default value, an undefined or null value, or an error value), and accordingly, an additional protocol may be omitted.

Referring to FIG. 8A, in operation S81a, a first master 810a may provide a first read request to a resource sharing interface 820a. For example, the first master 810a may provide the first read request to the resource sharing interface 820a to obtain a semaphore for accessing a slave. In some embodiments, the first read request may correspond to a read operation to be initially performed by accessing the slave by the first master 810a. In some embodiments, the first read request may be provided to the resource sharing interface 820a ahead of a write operation to be initially performed on the slave by the first master 810a.

In operation S83a, the resource sharing interface 820a may allocate a semaphore to the first master 810a. Then, in operation S85a, the resource sharing interface 820a may provide a read value to the first master 810a. Accordingly, the first master 810a may receive a value (or data) corresponding to the first read request provided in operation S81a, and may identify that the semaphore has been allocated thereto. The first master 810a having obtained a semaphore may provide a read request and/or a write request to the resource sharing interface 820a according to a necessary operation.

In operation S87a, the first master 810a may provide a second read request to the resource sharing interface 820a. For example, the first master 810a may provide the second read request to the resource sharing interface 820a to obtain a semaphore for accessing a slave.

In operation S89a, the resource sharing interface 820a may provide a value indicating an allocation failure of a semaphore. As illustrated in FIG. 8A, when the semaphore is not allocated to the first master 810a during a time that begins when the second read request has been received in operation S87a and lasts through the first expiration interval E1, the resource sharing interface 820a may terminate processing for the second read request. To inform the first master 810a of termination of processing for the second read request, the resource sharing interface 820a may provide, to the first master 810a, a value that is not normally readable in response to the second read request. For example, the second read request in operation S87a may intend to read a value of a register, and the resource sharing interface 820a may provide, to the first master 810a, a value that is not defined by a value of the register. Accordingly, the first master 810a may identify a failure of obtaining a semaphore based on a value received from the resource sharing interface 820a.

Referring to FIG. 8B, in operation S81b, a first master 810b may provide a third read request to a resource sharing interface 820b. For example, the first master 810b may provide the third read request to the resource sharing interface 820b to obtain a semaphore for accessing a slave. In some embodiments, the third read request may include a dedicated access request for obtaining a semaphore, and the first master 810b may provide the third read request to the resource sharing interface 820b ahead of an operation to be initially performed (e.g., a read operation or a write operation) by accessing a slave.

In operation S83b, the resource sharing interface 820b may allocate a semaphore to the first master 810b. Then, in operation S85b, the resource sharing interface 820b may provide a value indicating allocation of a semaphore to the first master 810b. As described above, the third read request dedicated to obtain a semaphore may be defined, and a value indicating allocation of a semaphore and a value indicating a failure of allocating semaphore, which are provided to the first master 810b in response to the third read request, may be predefined. Accordingly, the first master 810b may identify that the semaphore has been allocated thereto, and the first master 810b having obtained a semaphore may provide, to the resource sharing interface 820b, a read request and/or a write request according to a necessary operation.

In operation S87b, the first master 810b may provide a fourth read request to the resource sharing interface 820b. For example, the first master 810b may provide the fourth read request to the resource sharing interface 820b to obtain a semaphore for accessing a slave.

In operation S89b, the resource sharing interface 820b may provide a value indicating an allocation failure of a semaphore. As illustrated in FIG. 8A, when the semaphore is not allocated to the first master 810b during a time that begins from when the fourth read request has been received in operation S87b and lasts through the first expiration interval E1, the resource sharing interface 820b may terminate processing for the fourth read request. To inform the first master 810b of termination of processing the fourth read request, the resource sharing interface 820b may provide a pre-defined value to the first master 810a. Accordingly, the first master 810b may identify a failure of obtaining a semaphore based on a value received from the resource sharing interface 820b.

Figure 9:
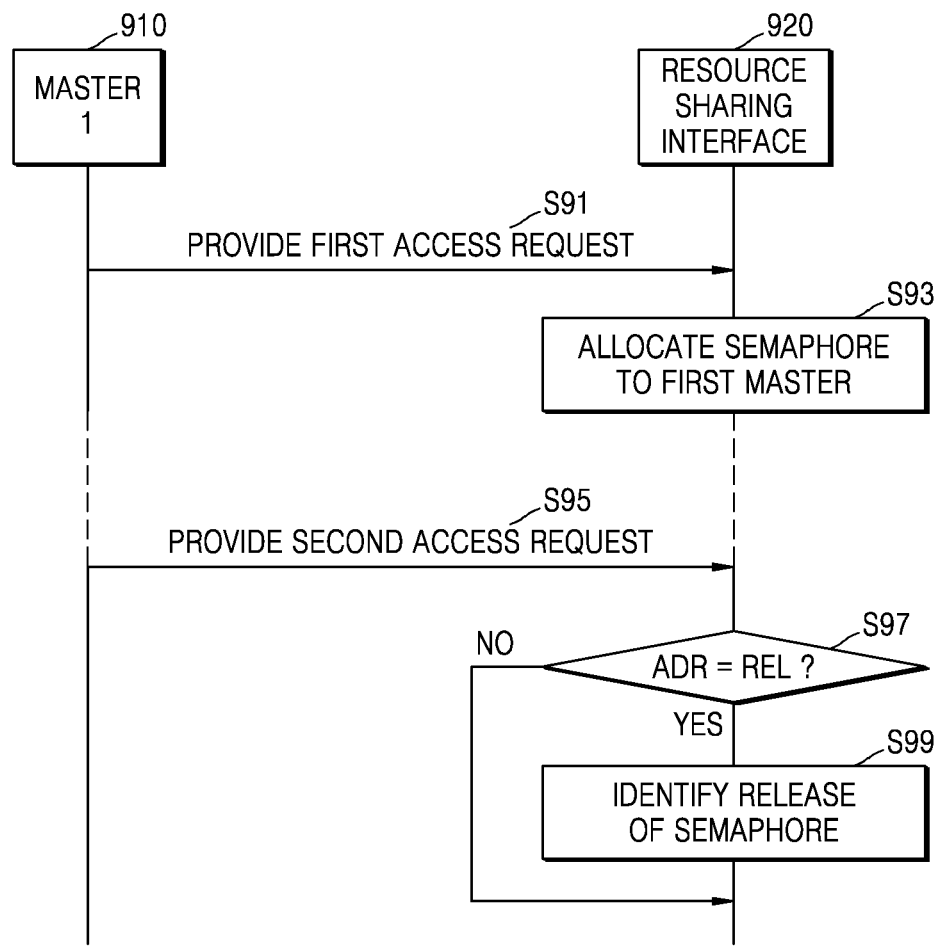
FIG. 9 is a message diagram of a method of sharing a resource, according to an example embodiment.

FIG. 9 is a message diagram of a method of sharing a resource, according to an example embodiment. The message diagram of FIG. 9 illustrates an example of an operation of releasing a semaphore. Hereinafter, as described with reference to FIG. 9, a semaphore may be released by a general access request, and accordingly, an additional protocol for releasing a semaphore may be omitted.

Referring to FIG. 9, in operation S91, a first master 910 may provide the first access request to a resource sharing interface 920. For example, the first master 910 may provide the first access request to the resource sharing interface 920 to obtain a semaphore for accessing a slave. In this example, the first access request might not include a further read or write request, and may only include a request for the semaphore. Then, in operation S93, the resource sharing interface 920 may allocate a semaphore to the first master 910.

In operation S95, the first master 910 may provide the second access request to the resource sharing interface 920. For example, the first master 910 may provide the second access request to the resource sharing interface 920 to release the semaphore. In some embodiments, the first master 910 may use an access request accessing a particular address for releasing the semaphore. For example, the second access request may include a read request or a write request including a pre-defined address.

In operation S97, the resource sharing interface 920 may determine whether an address ADR included in the second access request matches a pre-defined value REL. In operation S99, as illustrated in FIG. 9, when the address ADR matches the pre-defined value REL, the resource sharing interface 920 may identify release of the semaphore.

Figure 10:
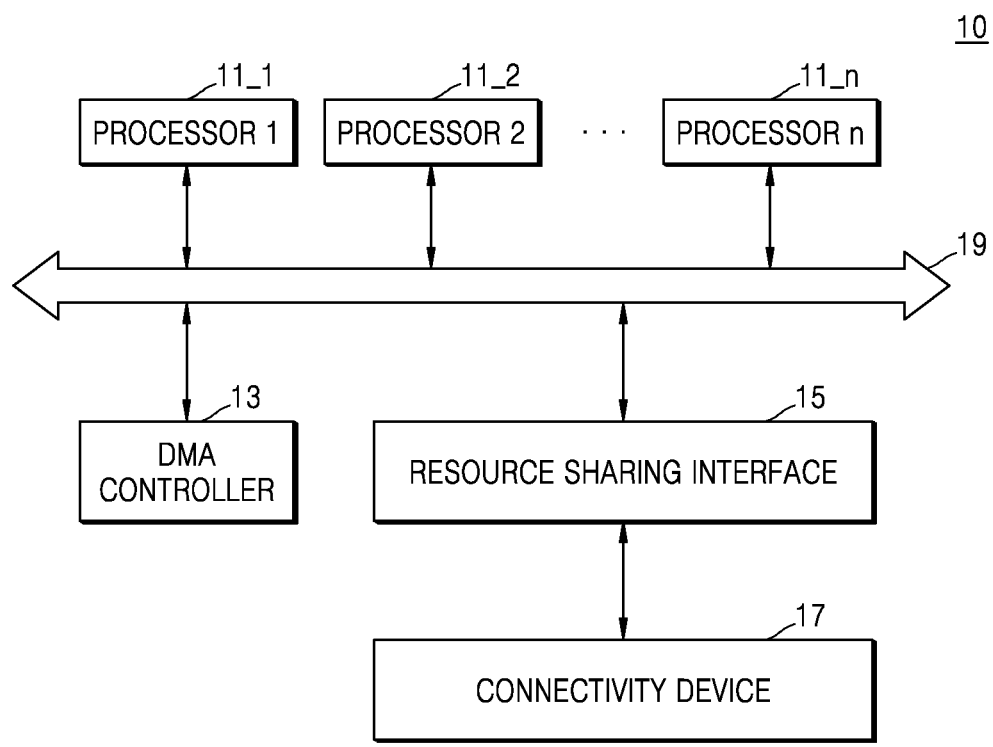
FIG. 10 is a block diagram of a system-on-chip according to an example embodiment.

FIG. 10 is a block diagram of a system on chip 10 according to an example embodiment. In some embodiments, the system on chip 10 may be manufactured by using a semiconductor process, and may be included as a component by various products. As illustrated in FIG. 10, the system on chip 10 may include first through $n^{th}$ processors 11_1 through 11_n (where n is an integer greater than 1), a DMA controller 13, a resource sharing interface 15, a connectivity device 17, and a bus 19.

The first through $n^{th}$ processors 11_1 through 11_n and the DMA controller 13 may be masters, and may share the connectivity device 17 which is a slave. For example, the connectivity device 17 may provide a communication channel, such as WiFi, Bluetooth, I2C, and I2S, with an object outside the system on chip 10, and the processors 1 through n 11_1 through 11_n and the DMA controller 13 may use data received from the outside of the system on chip 10 or provide data to the outside of the system on chip 10, by accessing the connectivity device 17.

The resource sharing interface 15 may provide an interface between the connectivity device 17 and masters, that is, the first through $n^{th}$ processors 11_1 through 11_n and the DMA controller 13 so that the connectivity device 17 is efficiently shared. For example, as described above with reference to diagrams, when a master has waited to obtain a semaphore for accessing the connectivity device 17 during a throttle interval, the resource sharing interface 15 may provide a message indicating that the throttle interval has elapsed to the corresponding master. In addition, when a master has waited for obtaining a semaphore for accessing the connectivity device 17 during an expiration interval, the resource sharing interface 15 may provide a message indicating completion of processing for an access request to the corresponding master. The throttle interval and the expiration interval may be independently defined and measured in the resource sharing interface 15, and the resource sharing interface 15 may include timers respectively corresponding to masters. A message provided to the resource sharing interface 15 by a master for obtaining or releasing the semaphore may include a general access request, and accordingly, additional protocol for obtaining or releasing the semaphore may be omitted.

While the inventive concept has been particularly shown and described with reference to embodiments thereof, it will be understood that various changes in form and details may be made therein without departing from the spirit and scope of the following claims.

What is claimed is:

1. A device that provides an interface between a plurality of master devices and a slave device, the device comprising:
a first timer configured to begin timing when a first access request is received from a first master device via a bus, and to be reset when a semaphore is allocated to the first master device;
a second timer configured to begin timing when a second access request is received from a second master device via the bus, and to be reset when the semaphore is allocated to the second master device; and
a controller configured to provide a first message to the first master device via the bus when a first expiration interval is measured by the first timer, and to provide the first message to the second master via the bus when a second expiration interval is measured by the second timer.

2. The device of claim 1, wherein the first expiration interval is different from the second expiration interval.

3. The device of claim 1, wherein the first timer is configured to be reset or terminated when the first expiration interval is measured, and
wherein the second timer is configured to be reset or terminated when the second expiration interval is measured.

4. The device of claim 1, wherein, when a first throttle interval is measured by the first timer, the controller is configured to provide a second message to the first master device via the bus, and
wherein, when a second throttle interval that is shorter than the second expiration interval is measured by the second timer, the controller is configured to provide the second message to the second master device via the bus.

5. The device of claim 4, wherein the first throttle interval is different from the second throttle interval.

6. The device of claim 4, wherein, when the first throttle interval is measured but the second throttle interval is not measured, the controller allocates the semaphore to the first master device.

7. The device of claim 4, wherein the controller is configured to receive a first value from the first timer,
and is further configured to receive a second value from the second timer, and
is further configured to allocate the semaphore to one of the first master device and the second master device, wherein the allocation is based on a first difference between the first value and a third value both corresponding to the first throttle interval and a second difference between the second value and a fourth value both corresponding to the second throttle interval.

8. The device of claim 1, wherein each of the first access request and the second access request is a read request for the slave device, and
the first message comprises a value indicating an allocation failure of the semaphore.

9. The device of claim 8, wherein the controller is configured to, when the semaphore is allocated to the first master device, provide a second message to the first master device via the bus, wherein the second message comprises a value indicating allocation of the semaphore, and,
when the semaphore is allocated to the second master device, the controller is further configured to provide the second message comprising the value indicating allocation of the semaphore, to the second master device via the bus.

10. The device of claim 1, wherein, when an access request comprising a first address is received from the first master device or the second master device, to which the semaphore has been allocated, the controller is configured to identify release of the semaphore based on the access request.

11. A method for providing an interface between a plurality of master devices and a slave device, the method comprising:
when an access request is received from a first master device via a bus, starting a first timer that corresponds to the first master device from among a plurality of timers respectively corresponding to the plurality of master devices;
when a semaphore is allocated to the first master device, resetting the first timer; and
when a first expiration interval that corresponds to the first master device from among a plurality of expiration intervals respectively corresponding to the plurality of master devices is measured by the first timer, providing a first message to the first master device via the bus.

12. The method of claim 11, further comprising:
when the first expiration interval is measured, resetting or stopping the first timer.

13. The method of claim 11, further comprising:
when a first throttle interval that corresponds to the first master device from among a plurality of throttle intervals respectively corresponding to the plurality of master devices-is measured by the first timer, providing a second message to the first master device via the bus,
wherein the first throttle interval is shorter than the first expiration interval.

14. The method of claim 13, further comprising:
when the semaphore is released by the first master device, allocating the semaphore to a master device that corresponds to a timer in which a throttle interval has been measured, from among the plurality of timers.

15. The method of claim 13, further comprising:
when the semaphore has been released by the first master device but a throttle interval has not been measured in each of the plurality of timers, allocating the semaphore to a master device that corresponds to a timer that has an elapsed time that is closest to the throttle interval from among the plurality of timers.

16. The method of claim 11, wherein the access request is a read request for the slave device, and
the first message comprises a value indicating an allocation failure of the semaphore.

17. The method of claim 11, further comprising:
when an access request comprising a first address is received from the first master device to which the semaphore has been allocated, identifying release of the semaphore.

18. A device that provides an interface between a plurality of master devices and a slave device, the device comprising:
a plurality of timers respectively corresponding to the plurality of master devices; and
a controller configured to allocate a semaphore to the plurality of master devices,
wherein each of the plurality of timers is configured to begin timing when an access request is received from a master device corresponding to each of the plurality of timers via a bus, and to be reset when the semaphore is allocated to the master device, and
wherein the controller is configured to provide a first message via the bus to a master device that corresponds to a timer with an expiration interval that has been measured, based on a plurality of expiration intervals respectively corresponding to the plurality of master devices.

19. The device of claim 18, wherein the controller is configured to provide a second message to the master device based on a timer with a throttle interval that has been measured, from among a plurality of timers, based on a plurality of throttle intervals respectively corresponding to the plurality of master devices.

20. The device of claim 19, wherein, when the semaphore has been released, the controller is configured to allocate the released semaphore to the master device corresponding to the timer with the throttle interval that has been measured, from among the plurality of timers.

* * * * *